United States Patent
Zou et al.

(10) Patent No.: US 10,178,252 B2
(45) Date of Patent: Jan. 8, 2019

(54) PHOTOGRAPHING PROCESS REMAINING TIME REMINDER METHOD AND SYSTEM (71) Applicant: Nubia Technology Co., Ltd., Guangdong (CN)

(72) Inventors: Mingshuang Zou, Guangdong (CN); Yuxing Wei, Guangdong (CN); Xiaohui Cui, Guangdong (CN); Lei Miao, Guangdong (CN); Qiang Li, Guangdong (CN)

(73) Assignee: Nubia Technology Co., Ltd., Guangdong (CN)

( * ) Notice: Subject to any disclaimer, the term of this patent is extended or adjusted under 35 U.S.C. 154(b) by 8 days.

(21) Appl. No.: 15/327,475

(22) PCT Filed: Jul. 2, 2015

(86) PCT No.: PCT/CN2015/083191
§ 371 (c)(1),
(2) Date: Jan. 19, 2017

(87) PCT Pub. No.: WO2016/011881
PCT Pub. Date: Jan. 28, 2016

(65) Prior Publication Data
US 2017/0171404 A1    Jun. 15, 2017

(30) Foreign Application Priority Data
Jul. 25, 2014    (CN) .......................... 2014 1 0362541

(51) Int. Cl.
*H04N 5/232*    (2006.01)
*H04N 1/00*    (2006.01)
(Continued)

(52) U.S. Cl.
CPC ..... *H04N 1/00477* (2013.01); *H04N 1/00899* (2013.01); *H04N 5/232* (2013.01);
(Continued)

(58) Field of Classification Search
CPC .................................................. H04N 1/00477
(Continued)

(56) References Cited

U.S. PATENT DOCUMENTS 6,522,361 B2    2/2003    Higuchi et al.
7,449,863 B2    11/2008    Tashiro
(Continued)

FOREIGN PATENT DOCUMENTS

CN    104104878 A    10/2014

OTHER PUBLICATIONS

PCT International Search Report and Written Opinion for PCT Application No. PCT/CN2015/083191 dated Sep. 6, 2015 (10 pages).

*Primary Examiner* — Joel W Fosselman
(74) *Attorney, Agent, or Firm* — Eversheds Sutherland (US) LLP (57) ABSTRACT

Provided is a method and a system for reminding a remaining time for shooting in a shooting process. The method includes: acquiring, by a terminal, a remaining memory space and/or a remaining battery power of the terminal in a shooting process; determining, by the terminal, a first remaining time for shooting according to the acquired remaining battery power; and/or determining, by the terminal, a second remaining time for shooting of the terminal according to the acquired remaining memory space; and displaying, by the terminal, the first remaining time for shooting and/or the second remaining time for shooting, or displaying, by the terminal, the smaller one between the first remaining time for shooting and the second remaining time for shooting.

18 Claims, 4 Drawing Sheets

(51) Int. Cl.
    *H04N 5/77* (2006.01)
    *H04N 5/907* (2006.01)
    *H04N 101/00* (2006.01)

(52) U.S. Cl.
    CPC ..... *H04N 5/23241* (2013.01); *H04N 5/23293* (2013.01); *H04N 5/77* (2013.01); *H04N 5/772* (2013.01); *H04N 5/907* (2013.01); *H04N 2101/00* (2013.01); *H04N 2201/214* (2013.01)

(58) Field of Classification Search
    USPC .................................................. 348/207.99
    See application file for complete search history.

(56) References Cited

U.S. PATENT DOCUMENTS

| | | |
|---|---|---|
| 7,869,697 B2 | 1/2011 | Nagaoka et al. |
| 8,005,340 B2 | 8/2011 | Shimoda et al. |
| 8,030,939 B2 | 10/2011 | Abe |
| 2003/0202216 A1* | 10/2003 | Nakama ............. H04N 1/00477 358/302 |
| 2009/0058423 A1* | 3/2009 | Abe ................... G01R 31/3606 324/426 |

\* cited by examiner

PHOTOGRAPHING PROCESS REMAINING TIME REMINDER METHOD AND SYSTEM

TECHNICAL FIELD

The present disclosure relates to the technical field of reminding a remaining time for shooting in a shooting process, in particular to a method and a system for reminding a remaining time for shooting in a shooting process.

BACKGROUND

With the continuous improvement of camera shooting hardware of mobile terminals such as mobile phones and tablet computers, shoot functions of the mobile terminals are increasingly diversified and shoot requirements of users on the mobile terminals are increasingly high. At present, the mobile terminals have functions of shooting pictures and videos, and especially, in an object movement trajectory shooting process, a corresponding object movement trajectory needs to be generated based on a combination of pictures taken at multiple times. However, due to the limitation of the memory space of the mobile terminals, the situation of power outage or insufficient memory space may occur in the object movement trajectory shooting process, causing loss of the photographed pictures.

SUMMARY

The main object of the present disclosure is to solve the technical problem of loss of pictures in an object movement trajectory shooting process.

In order to solve the above-mentioned technical problem, the following technical solution is adopted:

A method for reminding a remaining time for shooting in a shooting process, including the following steps:

acquiring, by a terminal, a remaining memory space and/or a remaining battery power of the terminal in a shooting process;

determining, by the terminal, a first remaining time for shooting according to the acquired remaining battery power; and/or determining, by the terminal, a second remaining time for shooting of the terminal according to the acquired remaining memory space; and displaying, by the terminal, the first remaining time for shooting and/or the second remaining time for shooting, or displaying, by the terminal, the smaller one between the first remaining time for shooting and the second remaining time for shooting.

Alternatively, before the step of acquiring, by a terminal, a remaining memory space and/or a remaining battery power of the terminal in a shooting process, the method further includes:

acquiring, by the terminal, the remaining memory space and/or remaining battery power of the terminal at a moment when an object movement trajectory shooting instruction is detected;

determining, by the terminal, a third remaining time for shooting according to pre-stored power consumption per unit and the acquired remaining battery power; and/or determining, by the terminal, a fourth remaining time for shooting of the terminal according to a pre-stored picture shooting time interval, a picture capacity size and the acquired remaining memory space; and outputting, by the terminal, first prompt information when the third remaining time for shooting and/or the fourth remaining time for shooting are/is less than a preset threshold.

Alternatively, the step of outputting, by the terminal, first prompt information when the third remaining time for shooting and/or the fourth remaining time for shooting are/is less than a preset threshold includes:

outputting, by the terminal, charging prompt information when the third remaining time for shooting is less than the preset threshold; outputting, by the terminal, memory space arrangement prompt information when the fourth remaining time for shooting is less than the preset threshold.

Alternatively, the step of displaying, by the terminal, the first remaining time for shooting and/or the second remaining time for shooting, or displaying the smaller one between the first remaining time for shooting and the second remaining time for shooting includes:

displaying, by the terminal, the first remaining time for shooting and/or the second remaining time for shooting, and outputting second prompt information when the first remaining time for shooting and/or the second remaining time for shooting are/is less than an acquired current remaining time for shooting; or outputting, by the terminal, third prompt information when the first remaining time for shooting and/or the second remaining time for shooting are/is less than the acquired current remaining time for shooting.

Alternatively, after the step of displaying, by the terminal, the first remaining time for shooting and/or the second remaining time for shooting, or displaying the smaller one between the first remaining time for shooting and the second remaining time for shooting, the method further includes:

transmitting, by the terminal, a photographed picture to a preset other terminal when the first remaining time for shooting and/or the second remaining time for shooting are/is less than an acquired current remaining time for shooting; or deleting, by the terminal, a preset type of data in the memory space when the second remaining time for shooting is less than a preset threshold.

Alternatively, the step of determining, by the terminal, a first remaining time for shooting according to the acquired remaining battery power includes: determining the first remaining time for shooting based on power consumption per unit and the acquired remaining battery power; and the step of determining, by the terminal, a second remaining time for shooting of the terminal according to the acquired remaining memory space includes: determining the second remaining time for shooting according to a pre-stored picture shooting time interval, a picture capacity size and the acquired remaining memory space.

A system for reminding a remaining time for shooting in a shooting process includes an acquisition module, a determination module and an output module, herein, the acquisition module is arranged to acquire a remaining memory space and/or remaining battery power of a terminal in which the system is installed in a shooting process;

the determination module is arranged to determine a first remaining time for shooting according to the acquired remaining battery power; and/or determine a second remaining time for shooting of the terminal according to the acquired remaining memory space; and the output module is arranged to display the first remaining time for shooting and/or the second remaining time for shooting, or display the smaller one between the first remaining time for shooting and the second remaining time for shooting.

Alternatively, the acquisition module is further arranged to acquire the remaining memory space and/or remaining battery power of the terminal at a moment when an object movement trajectory shooting instruction is detected;

the determination module is further arranged to determine a third remaining time for shooting according to pre-stored power consumption per unit and acquired remaining battery power; and/or determine a fourth remaining time for shooting of the terminal according to a pre-stored picture shooting time interval, a picture capacity size and the acquired remaining memory space; and the output module is further arranged to output first prompt information when the third remaining time for shooting and/or the fourth remaining time for shooting are/is less than a preset threshold.

Alternatively, the output module is further arranged to output charging prompt information when the third remaining time for shooting is less than the preset threshold; and output memory space arrangement prompt information when the fourth remaining time for shooting is less than the preset threshold.

Alternatively, the output module is further arranged to display the first remaining time for shooting and/or the second remaining time for shooting, and output second prompt information when the first remaining time for shooting and/or the second remaining time for shooting are/is less than an acquired current remaining time for shooting; or output third prompt information when the first remaining time for shooting and/or the second remaining time for shooting are/is less than the acquired current remaining time for shooting.

Alternatively, the system further includes a processing module, herein, the processing module is arranged to transmit a photographed picture to a preset other terminal when the first remaining time for shooting and/or the second remaining time for shooting are/is less than an acquired current remaining time for shooting; or delete a preset type of data in the memory space when the second remaining time for shooting is less than a preset threshold.

Alternatively, the system further includes a computing module, herein, the computing module is arranged to determine the first remaining time for shooting according to the acquired remaining battery power in a way as follows: determining the first remaining time for shooting based on power consumption per unit and the acquired remaining battery power; and the computing module is arranged to determine the second remaining time for shooting according to the acquired remaining memory space in a way as follows: determining the second remaining time for shooting according to a pre-stored picture shooting time interval, a picture capacity size and the acquired remaining memory space.

A computer program carrier carries a computer program, the computer program including program instructions, when being executed by a terminal, enabling the terminal to execute the method for reminding the remaining time for shooting in the shooting process according to any one of the above.

A method for reminding a remaining time for shooting in a shooting process includes:

computing a remaining time for shooting according to a preset effect model of a photographed object and a current shooting result.

Alternatively, the step of computing a remaining time for shooting according to a preset effect model of a photographed object and a current shooting result includes:

computing the remaining time for shooting according to the preset effect model of the photographed object, the current shooting result and a time spent on the current shooting result.

A system for reminding a remaining time for shooting in a shooting process includes:

a computing module arranged to compute a remaining time for shooting according to a preset effect model of a photographed object and a current shooting result.

Alternatively, the computing module is further arranged to compute the remaining time for shooting according to the preset effect model of the photographed object, the current shooting result and a time spent on the current shooting result.

According to the method for reminding the remaining time for shooting in the shooting process in the technical solution, the terminal acquires a remaining memory space and/or remaining battery power of the terminal in fixed time or real time in an object movement trajectory shooting process, and determines the remaining time for shooting of the terminal according to the acquired remaining battery power and/or remaining memory space determined by remaining power consumption, performing a real-time or fixed-time reminder of the remaining time for shooting, so as to prompt the user to perform timely charging or memory space cleaning to prevent loss of pictures in the object movement trajectory shooting process; and the user does not need to manually view the current remaining battery power and remaining memory space, and it is very convenient.

The realization of the object, the function features and the advantages of the present disclosure will be further described in combination with the embodiments and with reference to the accompanying drawings.

Specific Embodiments

It should be appreciated that the specific embodiments described herein are just used for explaining the present disclosure instead of limiting the present disclosure.

Firstly, it needs to be stated that the wording "and/or" is used in the present disclosure for several times, the meaning of the wording is as follows: A and/or B means that A, B or A+B is feasible.

The present disclosure provides a method for reminding a remaining time for shooting in a shooting process.

Figure 1:
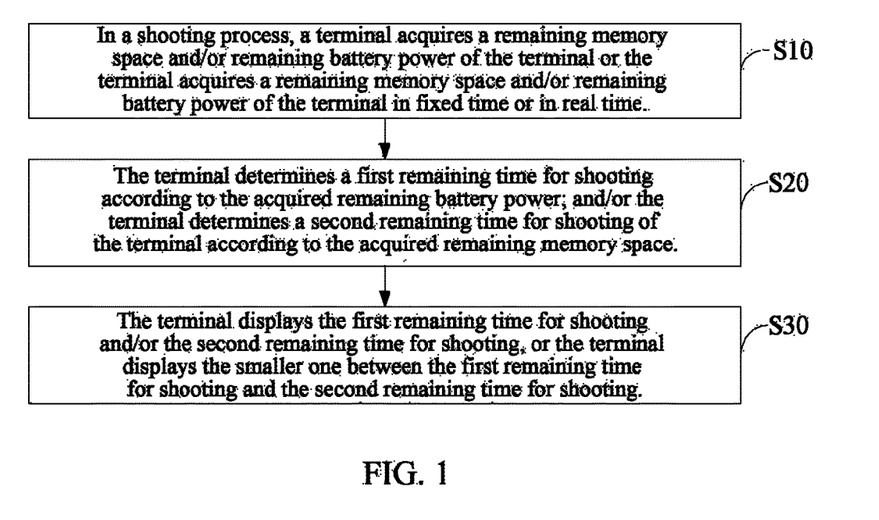
FIG. 1 illustrates a flowchart of a first embodiment of a method for reminding a remaining time for shooting in a shooting process according to the present disclosure.

Referring to FIG. 1, FIG. 1 illustrates a flowchart of a first embodiment of a method for reminding a remaining time for shooting in a shooting process according to the present disclosure.

The method for reminding the remaining time for shooting in the shooting process provided by this embodiment includes the following steps:

In step S10, a terminal acquires a remaining memory space and/or remaining battery power of the terminal, or the terminal acquires a remaining memory space and/or remaining battery power of the terminal in fixed time or in real time in a shooting process.

In this embodiment, the remaining memory space and/or remaining battery power are/is acquired in fixed time, and the remaining time length for an image shoot may be a time interval for shooting each picture when a moving object trajectory is taken or a time interval for acquiring each frame of picture in a video shooting process, etc.

This solution can be applied to the shooting process of an object movement trajectory, and the moving object may be that an object moves while a photographer does not move, i.e., the photographer moves relative to the object, for example, a planet and LightPainting; or that the object is stationary while the photographer moves; or that the photographer and the object move relative to each other. A specific process of shooting the moving object trajectory is as follows: when a first picture is taken, the first picture is used as a current picture to be synthesized; one picture is taken at an interval of a preset exposure time, and when each picture is taken, the current photographed picture is synthesized with the current picture to be synthesized to generate a new object movement trajectory picture, and the new object movement trajectory picture is used as the current picture to be synthesized; and when the shooting is ended, the current picture to be synthesized is used as the picture of the object movement trajectory or all to be synthesized pictures are used as a video of the moving object trajectory.

In step S20, the terminal determines a first remaining time for shooting according to the acquired remaining battery power; and/or the terminal determines a second remaining time for shooting of the terminal according to the acquired remaining memory space.

In this embodiment, the first remaining time for shooting may be determined based on power consumption per unit and remaining battery power, the power consumption per unit may be power consumption per minute or power consumption per second of the terminal in the shooting process, the second remaining time for shooting may be determined according to a pre-stored picture shooting time interval, a picture capacity size and the acquired remaining memory space, and the shooting time interval may be a shooting time interval for each picture in the object movement trajectory shooting process, or a shooting time interval for each frame of pictures in the video shooting process, or a shooting time interval for each picture in the shooting process of a group of pictures. In this embodiment, the picture capacity size is the size of the memory space occupied by the picture, and the power consumption per unit and the picture capacity size may be set by development personnel.

It can be appreciated by a person skilled in the art that, in the object movement trajectory shooting process, there may be some applications running in the background, such as QQ and WeChat, and these applications running in the background will also consume power. Thus, the step that the terminal determines the first remaining time for shooting according to the acquired remaining battery power includes that: the terminal acquires applications currently running in the background, and the terminal determines the first remaining time for shooting according to the pre-stored power consumption per unit for object movement trajectory shooting, the power consumption per unit of the applications running in the background and the acquired remaining battery power, such that the first remaining time for shooting is more accurately acquired.

In step S30, the terminal displays the first remaining time for shooting and/or the second remaining time for shooting, or the terminal displays the smaller one between the first remaining time for shooting and the second remaining time for shooting.

In this embodiment, the terminal may directly display the first remaining time for shooting and/or the second remaining time for shooting on a display screen of the terminal for a user to determine whether to perform charging or memory cleanup based on the first remaining time for shooting and/or the second remaining time for shooting, and the first remaining time for shooting and the second remaining time for shooting may be displayed in different areas when the first remaining time for shooting and the second remaining time for shooting are simultaneously displayed on the display screen, to facilitate users to distinguish and to perform charging or memory cleanup; or the first remaining time for shooting and the second remaining time for shooting are simultaneously displayed in the same area, and corresponding identifications are added before the first remaining time for shooting and the second remaining time for shooting.

It can be appreciated by a person skilled in the art that the terminal may display the first remaining time for shooting and/or the second remaining time for shooting, and simultaneously display a remaining time length for a current shooting operation, and the user compares a time for shooting and/or the second remaining time for shooting with the remaining time length for the current shooting operation to determine whether the current battery capacity and/or the remaining memory space can support the next shooting process.

According to the method for reminding the remaining time for shooting in the shooting process provided by this embodiment, in the object movement trajectory shooting process, the terminal acquires a remaining memory space and/or remaining battery power of the terminal in fixed time or in real time, and determines the remaining time for shooting of the terminal according to the acquired remaining battery power and/or remaining memory space determined by the remaining power consumption, performing a real-time or fixed-time reminder of the remaining time for shooting, so as to prompt the user to perform timely charging or memory space cleaning to prevent loss of pictures in the object movement trajectory shooting process; and the user does not need to manually view the current remaining battery power and remaining memory space, and it is very convenient.

Figure 2:
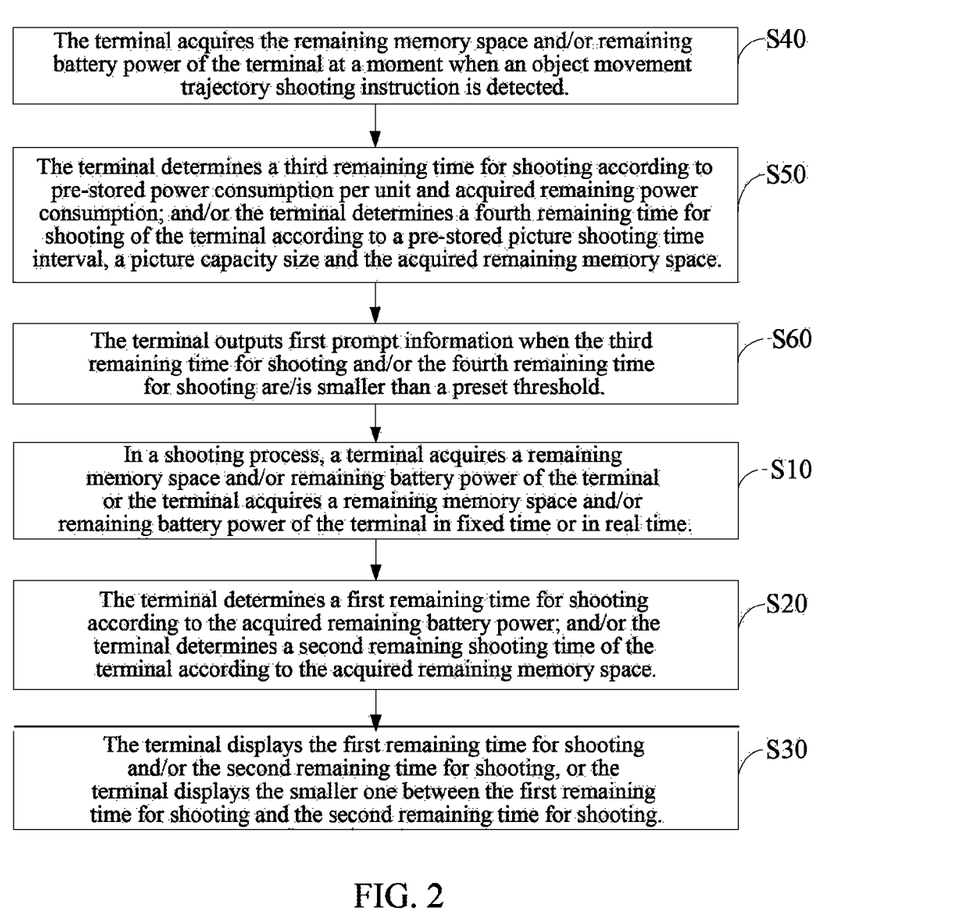
FIG. 2 illustrates a flowchart of a second embodiment of a method for reminding a remaining time for shooting in a shooting process according to the present disclosure.

Alternatively, in order to prevent interruption from occurring in the shooting process, referring to FIG. 2, a second embodiment of the method for reminding the remaining time for shooting in the shooting process of the present disclosure is provided based on the first embodiment, and in this embodiment, before the step S10, the method for reminding the remaining time for shooting in the shooting process includes the following steps: In step S40, the terminal acquires a remaining memory space and/or remaining battery power of the terminal at a moment when an object movement trajectory shooting instruction is detected;

in step S50, the terminal determines a third remaining time for shooting according to pre-stored power consumption per unit and acquired remaining battery power; and/or the terminal determines a fourth remaining time for shooting of the terminal according to a pre-stored picture shooting time interval, a picture capacity size and the acquired remaining memory space;

in step S60, the terminal outputs first prompt information when the third remaining time for shooting and/or the fourth remaining time for shooting is less than a preset threshold.

In the technical solution provided by this embodiment, the current battery power and the remaining memory space are detected before shooting so as to determine whether the current remaining battery power and memory space can support the current shooting process, to ensure that the shooting would not be interrupted due to insufficient battery power or insufficient memory space in the shooting process. The preset threshold is duration of the current shooting process.

In this embodiment, a solution of step S60 is that, the terminal outputs charging prompt information when the third remaining time for shooting is less than the preset threshold; and the terminal outputs memory space arrangement prompt information when the fourth remaining time for shooting is less than the preset threshold.

It can be appreciated by a person skilled in the art that, in the object movement trajectory shooting process, there may be some applications running in the background, such as QQ and WeChat, and these applications running in the background will also consume power. Thus, when the object movement trajectory shooting instruction is detected, the terminal acquires the remaining memory space and/or remaining battery power of the terminal and the applications currently running in the background; the terminal determines the third remaining time for shooting according to the pre-stored power consumption per unit for object movement trajectory shooting, the power consumption per unit of the applications running in the background and the acquired remaining battery power. The third remaining time for shooting determined according to this solution is more accurate.

Figure 3:
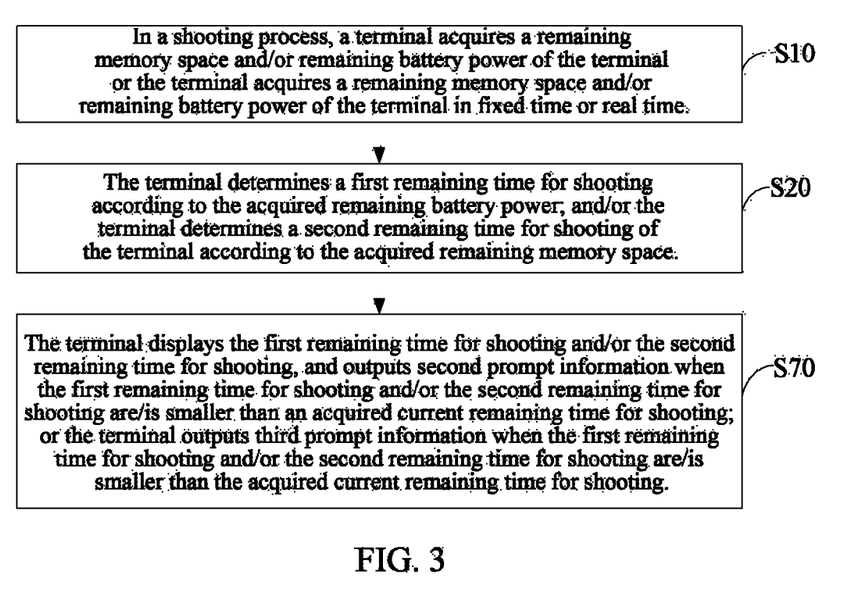
FIG. 3 illustrates a flowchart of a third embodiment of a method for reminding a remaining time for shooting in a shooting process according to the present disclosure.

Alternatively, in order to prevent interruption from occurring in the shooting process, referring to FIG. 3, a third embodiment of the method for reminding the remaining time for shooting in the shooting process of the present disclosure is provided based on the first embodiment, and in this embodiment, the step S30 is replaced as:

In step S70, the terminal displays the first remaining time for shooting and/or the second remaining time for shooting, and outputs second prompt information when the first remaining time for shooting and/or the second remaining time for shooting are/is less than an acquired current remaining time for shooting; or the terminal outputs third prompt information when the first remaining time for shooting and/or the second remaining time for shooting are/is less than the acquired current remaining time for shooting.

In this embodiment, the second prompt information may be text and light information, etc. For example, when the first remaining time for shooting is less than the current time for shooting, a power indicator lamp is controlled to turn on, and when the second remaining time for shooting is less than the current time for shooting, a memory space prompt lamp is controlled to turn on; or when the first remaining time for shooting is less than the current time for shooting, a charging prompt is output, and when the second remaining time for shooting is less than the current time for shooting, an insufficient memory space prompt is controlled.

In this embodiment, in order to prevent excessive text from being displayed on the display screen of the terminal, influencing normal shooting, when the first remaining time for shooting and/or the second remaining time for shooting are/is less than the acquired current remaining time for shooting, the terminal outputs third prompt information, and it is more intuitive when the third prompt information is light information.

Figure 4:
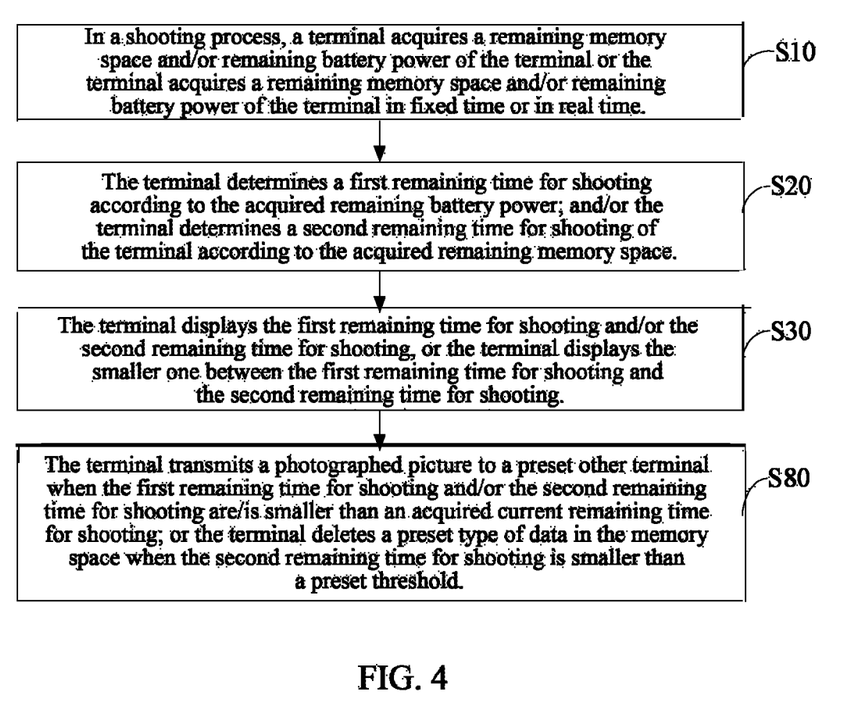
FIG. 4 illustrates a flowchart of a fourth embodiment of a method for reminding a remaining time for shooting in a shooting process according to the present disclosure.

Alternatively, in order to prevent interruption from occurring in the shooting process, referring to FIG. 4, a fourth embodiment of the method for reminding the remaining time for shooting in the shooting process of the present disclosure is provided based on the first embodiment, and in this embodiment, after step S30, the method for reminding the remaining time for shooting in the shooting process includes the following step:

In step S80, the terminal transmits photographed pictures to a preset other terminal when the first remaining time for shooting and/or the second remaining time for shooting are/is less than an acquired current remaining time for shooting; or the terminal deletes a preset type of data in the memory space when the second remaining time for shooting is less than a preset threshold.

In this embodiment, the preset type of data may be data that do not influence the current shooting, for example, when an object movement trajectory picture is generated from object movement trajectory shooting, the previously photographed pictures, other pictures to be synthesized except the current picture to be synthesized, and the pictures taken in the previous object movement trajectory shooting process may be deleted, and when an object movement trajectory video is generated from the object movement trajectory shooting, the pictures taken in the previous object movement trajectory shooting process may be deleted.

It can be appreciated by a person skilled in the art that, in order to prevent loss of the photographed pictures due to sudden power outage or insufficient memory space, when the first remaining time for shooting and/or the second remaining time for shooting are/is less than the acquired current remaining time for shooting, the terminal transmits the photographed pictures to the preset other terminal to guarantee that the pictures taken by the terminal would not be lost.

The present disclosure further provides a system for reminding a remaining time for shooting in a shooting process.

Figure 5:
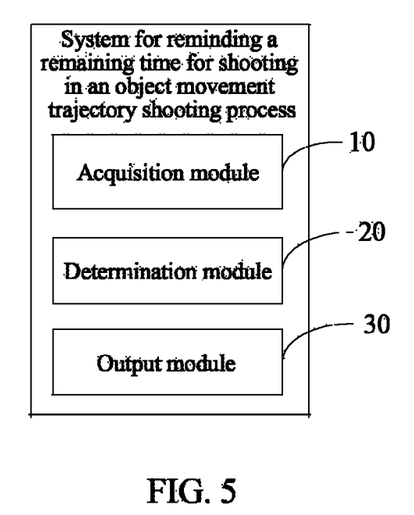
FIG. 5 illustrates a schematic diagram of functional modules of a first embodiment of a system for reminding a remaining time for shooting in a shooting process according to the present disclosure.

Referring to FIG. 5, FIG. 5 illustrates a schematic diagram of functional modules of a first embodiment of a system for reminding a remaining time for shooting in a shooting process according to the present disclosure.

The system for reminding the remaining time for shooting in the shooting process provided by this embodiment includes:

an acquisition module 10 arranged to acquire a remaining memory space and/or remaining battery power of a terminal in which the system is located in a shooting process;

In this embodiment, the remaining memory space and/or remaining battery power is acquired in fixed time, and the remaining time length for an image shoot may be a time interval for shooting each picture when a moving object trajectory is taken or a time interval for acquiring each frame of picture in a video shooting process, etc.

This solution can be applied to the shooting process of an object movement trajectory, and the moving object may be that an object moves while a photographer does not move, i.e., the photographer moves relative to the object, for example, a planet and LightPainting; or that the object is stationary while the photographer moves; or that the photographer and the object move relative to each other. A specific process of shooting the moving object trajectory is as follows: when a first picture is taken, the first picture is used as a current picture to be synthesized; one picture is taken at an interval of preset exposure time, and when each picture is taken, the current photographed picture is synthesized with the current picture to be synthesized to generate a new object movement trajectory picture, and the new object movement trajectory picture is used as a current picture to be synthesized; and when the shooting is ended, the current picture to be synthesized is used as the picture of the object movement trajectory or all pictures to be synthesized are used as a video of the moving object trajectory.

A determination module 20 is arranged to determine a first remaining time for shooting according to acquired remaining battery power; and/or determine a second remaining time for shooting of the terminal according to the acquired remaining memory space;

in this embodiment, the first remaining time for shooting may be determined based on power consumption per unit and remaining battery power, the power consumption per unit may be power consumption per minute or power consumption per second of the terminal in the shooting process, the second remaining time for shooting may be determined according to a pre-stored picture shooting time interval, a picture capacity size and the acquired remaining memory space, and the shooting time interval may be a shooting time interval for each picture in the object movement trajectory shooting process, or a shooting time interval for each frame of pictures in the video shooting process, or a shooting time interval for each picture in the shooting process of a group of pictures. In this embodiment, the picture capacity size is the size of the memory space occupied by the picture, and the power consumption per unit and the picture capacity size may be set by development personnel.

It can be understood by a person skilled in the art that, in the object movement trajectory shooting process, there may be some applications running in the background, such as QQ and WeChat, and these applications running in the background will also consume power. Thus, the determination module 20 is further arranged to acquire applications currently running in the background, and determine the first remaining time for shooting according to the pre-stored power consumption per unit for object movement trajectory shooting, the power consumption per unit of the applications running in the background and the acquired remaining battery power, such that the acquired first remaining time for shooting is more accurately acquired.

An output module 30 is arranged to display the first remaining time for shooting and/or the second remaining time for shooting, or display the smaller one between the first remaining time for shooting and the second remaining time for shooting.

In this embodiment, the output module 30 may directly display the first remaining time for shooting and/or the second remaining time for shooting on a display screen of the terminal for a user to determine whether to perform charging or memory cleanup based on the first remaining time for shooting and/or the second remaining time for shooting, and the first remaining time for shooting and the second remaining time for shooting may be displayed in different areas when the first remaining time for shooting and the second remaining time for shooting are simultaneously displayed by the output module 30 on the display screen, to facilitate the user to distinguish and to perform charging or memory cleanup; or the first remaining time for shooting and the second remaining time for shooting are simultaneously displayed by the output module 30 in the same area, and corresponding identifications are added before the first remaining time for shooting and the second remaining time for shooting.

It can be appreciated by a person skilled in the art that the output module 30 may display the first remaining time for shooting and/or the second remaining time for shooting and simultaneously display a remaining time length for a current shooting operation, and the user compares the time for shooting and/or the second remaining time for shooting with the remaining time length for the current shooting operation to determine whether the current battery capacity or the remaining memory space can support the next shooting process.

According to the system for reminding the remaining time for shooting in the shooting process provided by this embodiment, the terminal acquires the remaining memory space and/or the remaining battery power of the terminal in fixed time or in real time in the object movement trajectory shooting process, determines the remaining time for shooting of the terminal according to the acquired remaining battery power and/or remaining memory space determined by the remaining power consumption, performing a real-time or fixed-time reminder of the remaining time for shooting, so as to prompt the user to perform timely charging or memory space cleaning to prevent loss of pictures in the object movement trajectory shooting process; and the user does not need to manually view the current remaining battery power and remaining memory space, and it is very convenient.

Alternatively, in order to prevent interruption from occurring in the shooting process, in the first embodiment of the system for reminding the remaining time for shooting in the shooting process according to the present disclosure, the acquisition module 10 is further arranged to acquire the remaining memory space and/or remaining battery power of the terminal at a moment when an object movement trajectory shooting instruction is detected; the determination module 20 is further arranged to determine a third remaining time for shooting according to pre-stored power consumption per unit and acquired remaining battery power; and/or determine a fourth remaining time for shooting of the terminal according to a pre-stored picture shooting time interval, a picture capacity size and the acquired remaining memory space; and the output module 30 is further arranged to output first prompt information when the third remaining time for shooting and/or the fourth remaining time for shooting is less than a preset threshold.

In the technical solution provided by this embodiment, the current battery power and the remaining memory space are detected before shooting so as to determine whether the current remaining battery power and memory space can support the current shooting process, to ensure that the shooting would not be interrupted due to insufficient battery power or insufficient memory space in the shooting process. The preset threshold is duration of the current shooting process.

In this embodiment, a solution is that, the output module 30 outputs charging prompt information when the third remaining time for shooting is less than the preset threshold; and outputs memory space arrangement prompt information when the fourth remaining time for shooting is less than the preset threshold.

It can be appreciated by a person skilled in the art that, in the object movement trajectory shooting process, there may be some applications running in the background, such as QQ and WeChat, and these applications running in the background will also consume power. Thus, when the object movement trajectory shooting instruction is detected, the acquisition module 10 acquires the remaining memory space and/or remaining battery power of the terminal and the applications currently running in the background; and the determination module 20 determines the third remaining time for shooting according to the pre-stored power consumption per unit for object movement trajectory shooting, the power consumption per unit for the applications running in the background and the acquired remaining battery power. The third remaining time for shooting determined according this solution is more accurate.

Alternatively, in order to prevent interruption from occurring in the shooting process, in the first embodiment of the system for reminding the remaining time for shooting in the shooting process according to the present disclosure, the output module 30 is further arranged to display the first remaining time for shooting and/or the second remaining time for shooting, and output second prompt information when the first remaining time for shooting and/or the second remaining time for shooting are/is less than acquired current remaining time for shooting; or output third prompt information when the first remaining time for shooting and/or the second remaining time for shooting are/is less than the acquired current remaining time for shooting.

In this embodiment, the second prompt information may be text and light information, etc. For example, when the first remaining time for shooting is less than the current time for shooting, the output module 30 controls a power indicator lamp to turn on, and when the second remaining time for shooting is less than the current time for shooting, the output module 30 controls a memory space prompt lamp to turn on; or when the first remaining time for shooting is less than the current time for shooting, the output module 30 outputs a charging prompt, and when the second remaining time for shooting is less than the current time for shooting, the output module 30 outputs an insufficient memory space prompt.

In this embodiment, in order to prevent excessive text from being displayed on the display screen of the terminal, influencing normal shooting, when the first remaining time for shooting and/or the second remaining time for shooting are/is less than the acquired current remaining time for shooting, the output module 30 outputs third prompt information, and it is more intuitive when the third prompt information is light information.

Figure 6:
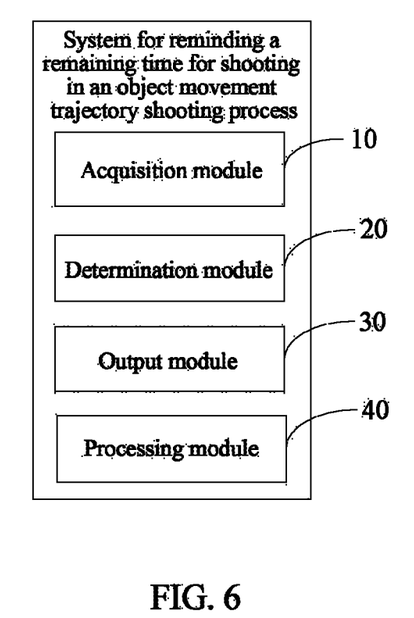
FIG. 6 illustrates a schematic diagram of functional modules of a second embodiment of a system for reminding a remaining time for shooting in a shooting process according to the present disclosure.

Alternatively, in order to prevent interruption from occurring in the shooting process, referring to FIG. 6, a second embodiment of the system for reminding the remaining time for shooting in the shooting process of the present disclosure is provided based on the first embodiment, and in this embodiment, the system for reminding the remaining time for shooting in the shooting process further includes:

a processing module 40, arranged to: transmit photographed pictures to a preset other terminal when the first remaining time for shooting and/or the second remaining time for shooting are/is less than an acquired current remaining time for shooting; or delete a preset type of data in the memory space when the second remaining time for shooting is less than a preset threshold.

In this embodiment, when the object movement trajectory picture is generated from object movement trajectory shooting, the processing module 40 may delete the previously photographed pictures, other pictures to be synthesized except the current picture to be synthesized, and the pictures taken in the previous object movement trajectory shooting process, and when the object movement trajectory video is generated from the object movement trajectory shooting, the processing module 40 may delete the pictures taken in the previous object movement trajectory shooting process.

It can be appreciated by a person skilled in the art that, in order to prevent loss of the photographed pictures due to sudden power outage or insufficient memory space, when the first remaining time for shooting and/or second remaining time for shooting are/is less than the acquired current remaining time for shooting, the processing module 40 transmits the photographed pictures to the preset other terminal to guarantee that the pictures taken by the terminal would not be lost.

The present disclosure further provides a method for reminding a remaining time for shooting in an embodiment.

The method for reminding the remaining time for shooting in the shooting process provided by this embodiment includes:

computing a remaining time for shooting according to a preset effect model of a photographed object and a current shooting result.

The effect model is a pattern of a mode or a style exhibited by shooting and imaging. For example, the effect model is an image superposing effect, an object movement trajectory model, etc.

In this embodiment, the preset effect model is a preset target trajectory picture. For example, when a preset object movement trajectory is circular, the picture corresponding to the current shooting result is compared with the preset target trajectory picture, and when the current shooting result corresponds to ⅓ of the preset target trajectory picture, the remaining time length corresponding to the remaining ⅔ shooting process is determined. The preset target trajectory may be an object movement trajectory such as a LightPainting trajectory.

Or, the preset effect model is a preset target trajectory picture, and at this moment, the step of "computing a remaining time for shooting according to a preset effect model of a photographed object and a current shooting result" includes: computing the remaining time for shooting according to the preset effect model of the photographed object, the current shooting result and a time spent on the current shooting result.

For example, when the preset object movement trajectory is circular and the current shooting result is ⅓ circle, the picture corresponding to the current shooting result is compared with the preset target trajectory picture, and when the current shooting result corresponds to ⅓ of the preset target trajectory picture and the time spent on shooting to a ⅓ stage is T, it can be determined that the remaining time length corresponding to the remaining ⅔ shooting process is 2T. The preset target trajectory may be an object movement trajectory such as a LightPainting trajectory.

The present disclosure further provides a system for reminding a remaining time for shooting in an embodiment.

The system for reminding the remaining time for shooting in the shooting process provided by this embodiment includes:

a computing module arranged to compute a remaining time for shooting according to a preset effect model of a photographed object and a current shooting result.

In this embodiment, the preset effect model is a preset target trajectory picture. For example, when a preset object movement trajectory is circular, the picture corresponding to the current shooting result is compared with the preset target trajectory picture, and when the current shooting result corresponds to ⅓ of the preset target trajectory picture, the remaining time length corresponding to the remaining ⅔ shooting process is determined. The preset target trajectory may be an object movement trajectory such as a LightPainting trajectory.

Or, the preset effect model is a preset target trajectory picture, and at this moment, the computing module is further arranged to compute the remaining time for shooting according to the preset effect model of the photographed object, the current shooting result and a time spent on the current shooting result.

For example, when the preset object movement trajectory is circular and the current shooting result is ⅓ circle, the picture corresponding to the current shooting result is compared with the preset target trajectory picture, and when the current shooting result corresponds to ⅓ of the preset target trajectory picture and the time spent on shooting to a ⅓ stage is T, it can be determined that the remaining time length corresponding to the remaining ⅔ shooting process is 2T. The preset target trajectory may be an object movement trajectory such as a LightPainting trajectory.

It needs to be stated that, in this text, the terms "include", "includes" and other variants are intended to cover nonexclusive inclusion, so that the process, method, object or system which includes a series of elements not only includes such elements but also further includes other elements which are not clearly listed, or intrinsic elements of the process, method, object or system. In the case of no more limitations, an element defined by a sentence "include a . . . " does not exclude other same elements existing in the process, method, object or system which includes the element.

The serial numbers of the embodiments of the present disclosure are only used for the purpose of depiction instead of indicating the merits of the embodiments.

Through the depictions of the above-mentioned embodiments, a person skilled in the art can clearly understand that the methods in the above-mentioned embodiments can be implemented by means of software plus necessary general hardware platforms, and certainly can also be implemented by means of hardware. However, under most circumstances, the former is preferred embodiment. Based on such understanding, the essence of the technical solution of the present disclosure or the part which makes a contribution to the prior art may be reflected in the form of a software product. The computer software product is stored on a storage medium (e.g. an ROM/RAM, a magnetic disk or a compact disk), including several instructions which are used for enabling a terminal device (which may be a mobile phone, a computer, a server, an air conditioner or a network device) to execute the method in each embodiment of the present disclosure.

The embodiments described above are just embodiments of the present disclosure and thus do not limit the patent scope of the present disclosure. Any equivalent structure, or equivalent flow transformation made according to the contents of the description and the drawings of the present disclosure or any direct or indirect application to other related arts shall be also included in the patent protection scope of the present disclosure.

The embodiments described above are just preferred embodiments of the present disclosure and thus do not limit the patent scope of the present disclosure. Any equivalent structure, or equivalent flow transformation made according to the contents of the description and the drawings of the present disclosure or any direct or indirect application to other related arts shall be also included in the patent protection scope of the present disclosure.

INDUSTRIAL APPLICABILITY

According to the method for reminding a remaining time for shooting in a shooting process in the technical solutions, the terminal acquires a remaining memory space and/or remaining battery power of the terminal in fixed time or in real time in an object movement trajectory shooting process, determines the remaining time for shooting of the terminal according to the acquired remaining battery power and/or remaining memory space determined by the remaining power consumption, performing a real-time or fixed-time reminder of the remaining time for shooting, so as to prompt the user to perform timely charging or memory space cleaning to prevent loss of pictures in the object movement trajectory shooting process; and the user does not need to manually view the current remaining battery power and remaining memory space, and it is very convenient. Therefore, the present disclosure has very strong industrial applicability.

What we claim is:

1. A method for reminding a remaining time for shooting in a shooting process, comprising the following steps:
    acquiring, by a terminal, a remaining memory space and/or a remaining battery power of the terminal in the shooting process;
    determining, by the terminal, a first remaining time for shooting according to the acquired remaining battery power; and/or determining, by the terminal, a second remaining time for shooting of the terminal according to the acquired remaining memory space; and
    displaying, by the terminal, the first remaining time for shooting and/or the second remaining time for shooting, or displaying, by the terminal, a smaller one between the first remaining time for shooting and the second remaining time for shooting;
    wherein, the step of determining, by the terminal, a first remaining time for shooting according to the acquired remaining battery power comprises: determining the first remaining time for shooting based on power consumption per unit and the acquired remaining battery power; and
    the step of determining, by the terminal, a second remaining time for shooting of the terminal according to the acquired remaining memory space comprises: determining the second remaining time for shooting according to a pre-stored picture shooting time interval, a picture capacity size and the acquired remaining memory space.

2. The method for reminding the remaining time for shooting in the shooting process according to claim 1, wherein, before the step of acquiring, by a terminal, a remaining memory space and/or a remaining battery power of the terminal in the shooting process, the method further comprises:
    acquiring, by the terminal, the remaining memory space and/or remaining battery power of the terminal at a moment when an object movement trajectory shooting instruction is detected;
    determining, by the terminal, a third remaining time for shooting according to pre-stored power consumption per unit and acquired remaining battery power; and/or determining, by the terminal, a fourth remaining time for shooting of the terminal according to a pre-stored picture shooting time interval, a picture capacity size and the acquired remaining memory space; and outputting, by the terminal, first prompt information when the third remaining time for shooting and/or the fourth remaining time for shooting are/is less than a preset threshold.

3. The method for reminding the remaining time for shooting in the shooting process according to claim 2, wherein the step of outputting, by the terminal, first prompt information when the third remaining time for shooting and/or the fourth remaining time for shooting are/is less than a preset threshold comprises:

outputting, by the terminal, charging prompt information when the third remaining time for shooting is less than the preset threshold; outputting, by the terminal, memory space arrangement prompt information when the fourth remaining time for shooting is less than the preset threshold.

4. The method for reminding the remaining time for shooting in the shooting process according to claim 1, wherein the step of displaying, by the terminal, the first remaining time for shooting and/or the second remaining time for shooting, or displaying the smaller one between the first remaining time for shooting and the second remaining time for shooting comprises:

displaying, by the terminal, the first remaining time for shooting and/or the second remaining time for shooting, and outputting second prompt information when the first remaining time for shooting and/or the second remaining time for shooting are/is less than an acquired current remaining time for shooting; or outputting, by the terminal, third prompt information when the first remaining time for shooting and/or the second remaining time for shooting are/is less than the acquired current remaining time for shooting.

5. The method for reminding the remaining time for shooting in the shooting process according to claim 1, wherein, after the step of displaying, by the terminal, the first remaining time for shooting and/or the second remaining time for shooting, or displaying the smaller one between the first remaining time for shooting and the second remaining time for shooting, the method further comprises:

transmitting, by the terminal, a photographed picture to a preset other terminal when the first remaining time for shooting and/or the second remaining time for shooting are/is less than an acquired current remaining time for shooting; or deleting, by the terminal, a preset type of data in a memory space when the second remaining time for shooting is less than a preset threshold.

6. A system for reminding a remaining time for shooting in a shooting process, comprising hardware configured to execute instructions stored in a non-transitory computer readable medium to execute steps in following modules: an acquisition module, a determination module, an output module, and a computing module wherein, the acquisition module is arranged to acquire a remaining memory space and/or remaining battery power of a terminal in which the system is located in the shooting process;

the determination module is arranged to determine a first remaining time for shooting according to the acquired remaining battery power; and/or determine a second remaining time for shooting of the terminal according to the acquired remaining memory space; and the output module is arranged to display the first remaining time for shooting and/or the second remaining time for shooting, or display a smaller one between the first remaining time for shooting and the second remaining time for shooting;

the computing module is arranged to determine the first remaining time for shooting according to the acquired remaining battery power in a way as follows: determining the first remaining time for shooting based on power consumption per unit and the acquired remaining battery power; and the computing module is arranged to determine the second remaining time for shooting according to the acquired remaining memory space in a way as follows: determining the second remaining time for shooting according to a pre-stored picture shooting time interval, a picture capacity size and the acquired remaining memory space.

7. The system for reminding the remaining time for shooting in the shooting process according to claim 6, wherein, the acquisition module is further arranged to acquire the remaining memory space and/or remaining battery power of the terminal at a moment when an object movement trajectory shooting instruction is detected;

the determination module is further arranged to determine a third remaining time for shooting according to pre-stored power consumption per unit and acquired remaining battery power; and/or determine a fourth remaining time for shooting of the terminal according to a pre-stored picture shooting time interval, a picture capacity size and the acquired remaining memory space; and the output module is further arranged to output first prompt information when the third remaining time for shooting and/or the fourth remaining time for shooting are/is less than a preset threshold.

8. The system for reminding the remaining time for shooting in the shooting process according to claim 7, wherein the output module is further arranged to output charging prompt information when the third remaining time for shooting is less than the preset threshold; and output memory space arrangement prompt information when the fourth remaining time for shooting is less than the preset threshold.

9. The system for reminding the remaining time for shooting in the shooting process according to claim 6, wherein the output module is further arranged to display the first remaining time for shooting and/or the second remaining time for shooting, and output second prompt information when the first remaining time for shooting and/or the second remaining time for shooting are/is less than an acquired current remaining time for shooting; or output third prompt information when the first remaining time for shooting and/or the second remaining time for shooting are/is less than the acquired current remaining time for shooting.

10. The system for reminding the remaining time for shooting in the shooting process according to claim 6, wherein the hardware is further configured to execute instructions stored in the non-transitory computer readable medium to execute steps in a following module: a processing module, wherein, the processing module is arranged to transmit a photographed picture to a preset other terminal when the first remaining time for shooting and/or the second remaining time for shooting is less than an acquired current remaining time for shooting; or delete a preset type of data in a memory space when the second remaining time for shooting is less than a preset threshold.

11. A computer program carrier carrying a computer program, the computer program comprising program instructions, when executed by a terminal,
enabling the terminal to execute the method for reminding the remaining time for shooting in the shooting process according to claim 1.

12. The method for reminding the remaining time for shooting in the shooting process according to claim 2, wherein the step of displaying, by the terminal, the first remaining time for shooting and/or the second remaining time for shooting, or displaying the smaller one between the first remaining time for shooting and the second remaining time for shooting comprises:
displaying, by the terminal, the first remaining time for shooting and/or the second remaining time for shooting, and outputting second prompt information when the first remaining time for shooting and/or the second remaining time for shooting are/is less than an acquired current remaining time for shooting; or outputting, by the terminal, third prompt information when the first remaining time for shooting and/or the second remaining time for shooting are/is less than the acquired current remaining time for shooting.

13. The method for reminding the remaining time for shooting in the shooting process according to claim 3, wherein the step of displaying, by the terminal, the first remaining time for shooting and/or the second remaining time for shooting, or displaying the smaller one between the first remaining time for shooting and the second remaining time for shooting comprises:
displaying, by the terminal, the first remaining time for shooting and/or the second remaining time for shooting, and outputting second prompt information when the first remaining time for shooting and/or the second remaining time for shooting are/is less than an acquired current remaining time for shooting; or outputting, by the terminal, third prompt information when the first remaining time for shooting and/or the second remaining time for shooting are/is less than the acquired current remaining time for shooting.

14. The system for reminding the remaining time for shooting in the shooting process according to claim 7, wherein the output module is further arranged to display the first remaining time for shooting and/or the second remaining time for shooting, and output second prompt information when the first remaining time for shooting and/or the second remaining time for shooting are/is less than an acquired current remaining time for shooting; or output third prompt information when the first remaining time for shooting and/or the second remaining time for shooting are/is less than the acquired current remaining time for shooting.

15. The system for reminding the remaining time for shooting in the shooting process according to claim 8, wherein the output module is further arranged to display the first remaining time for shooting and/or the second remaining time for shooting, and output second prompt information when the first remaining time for shooting and/or the second remaining time for shooting are/is less than an acquired current remaining time for shooting; or output third prompt information when the first remaining time for shooting and/or the second remaining time for shooting are/is less than the acquired current remaining time for shooting.

16. A computer program carrier carrying a computer program, the computer program comprising program instructions, when executed by a terminal, enabling the terminal to execute the method for reminding the remaining time for shooting in the shooting process according to claim 2.

17. A computer program carrier carrying a computer program, the computer program comprising program instructions, when executed by a terminal, enabling the terminal to execute the method for reminding the remaining time for shooting in the shooting process according to claim 3.

18. A computer program carrier carrying a computer program, the computer program comprising program instructions, when executed by a terminal, enabling the terminal to execute the method for reminding the remaining time for shooting in the shooting process according to claim 4.

* * * * *